April 5, 1938.  V. L. STATHEM  2,113,500
CUTTER AND PITTER FOR CLING STONE PEACHES
Filed Nov. 9, 1936  2 Sheets-Sheet 1
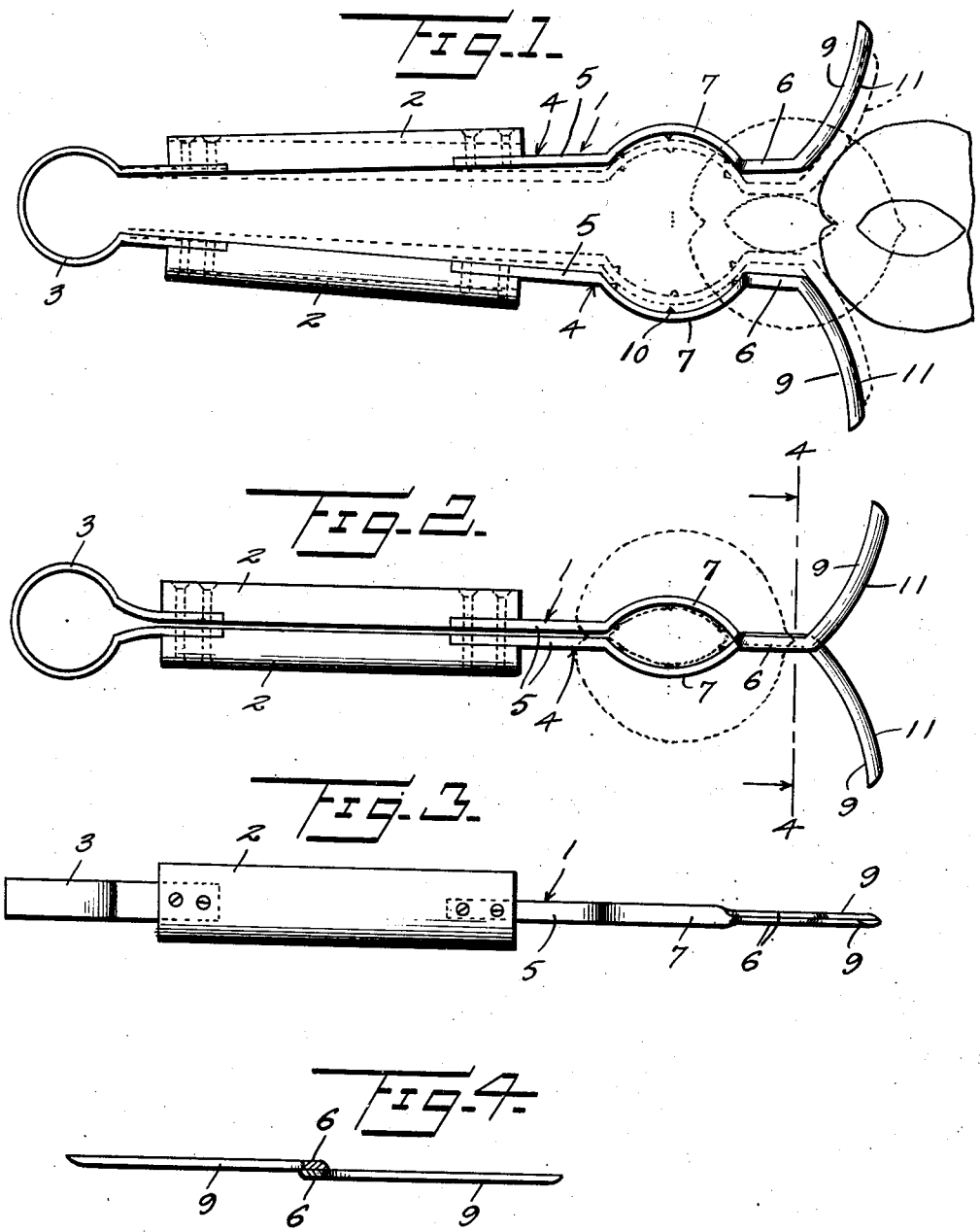

April 5, 1938.  V. L. STATHEM  2,113,500
CUTTER AND PITTER FOR CLING STONE PEACHES
Filed Nov. 9, 1936  2 Sheets-Sheet 2
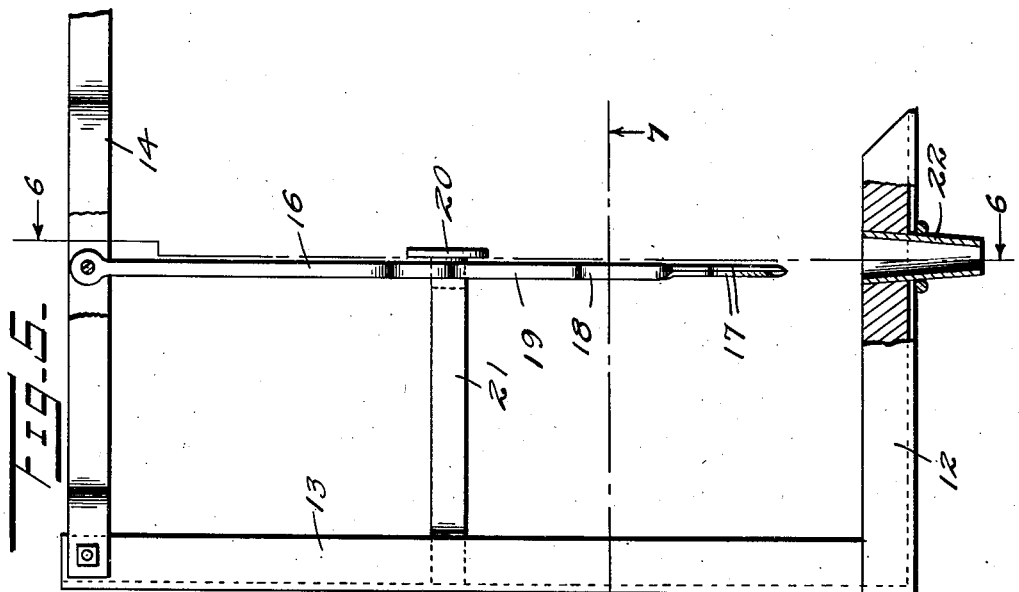
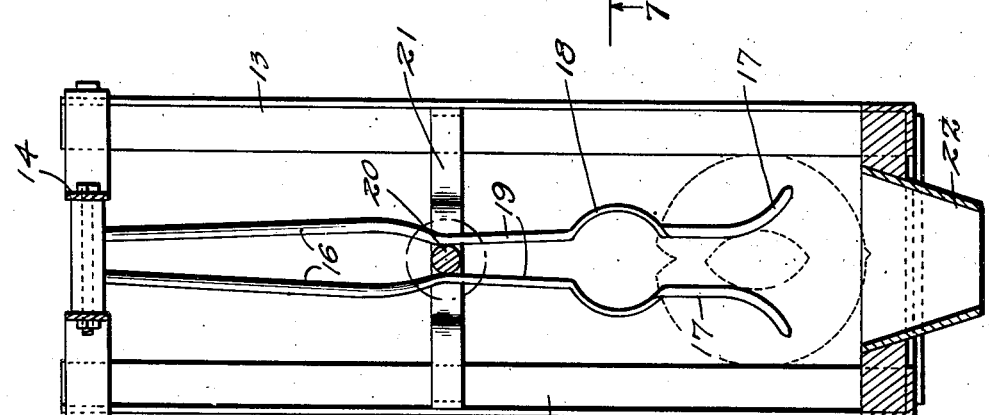
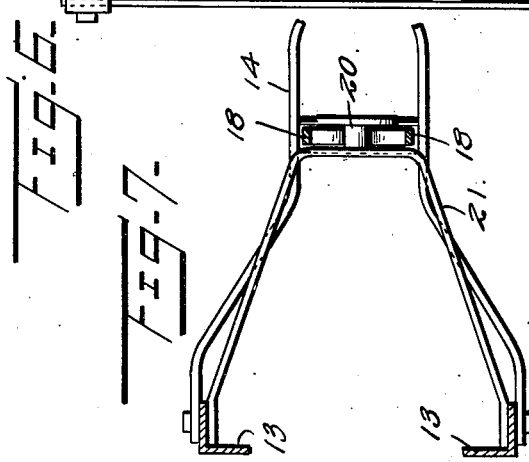
Vereau L. Stathem
INVENTOR
BY Victor J. Evans & Co.
ATTORNEY Patented Apr. 5, 1938

2,113,500

UNITED STATES PATENT OFFICE 2,113,500

CUTTER AND PITTER FOR CLING STONE PEACHES

Vereau L. Stathem, Riverdale, Calif.

Application November 9, 1936, Serial No. 109,997

1 Claim. (Cl. 146—28)

This invention relates to a combined cutter and pitter for cling stone peaches, and has for the primary object the provision of a device of this character which will in a single operation halve a peach and remove therefrom the pit or stone and which may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a combined cutter and pitter constructed in accordance with my invention.

Figure 2 is a view similar to Figure 1 showing the device after halving a peach and engaging the pit or stone.

Figure 3 is a side elevation illustrating the device.

Figure 4 is a sectional view taken on the line 4—4 of Figure 2.

Figure 5 is a side elevation, partly in section, illustrating a modified form of my invention.

Figure 6 is a sectional view taken on the line 6—6 of Figure 5.

Figure 7 is a sectional view taken on the line 7—7 of Figure 6.

Referring in detail to the drawings, the numeral 1 indicates a hand tool especially adapted for cutting and pitting a peach. The tool 1 includes a pair of grips 2. The grips are connected at one end by a spring element 3 acting to urge the grips together. Metallic members 4 are secured to the other ends of the grips and each include straight portions 5 and 6 and a curved portion 7 and a laterally extending portion 9. The curved portions 7 provide jaws to engage with and grip a pit or stone of a peach and have formed on their opposing faces projections 10 acting as teeth. The portions 9 of the members 4 are beveled to form cutting edges 11 and thereby provide knives. The straight portions 6 may move into overlapping relation when the grips 2 are moved in the direction of each other or into the position, as shown in Figure 2.

In operation, a person supports a peach in the fingers of one hand and grasps the grips 2 with the other hand. The peach and tool are then moved in the direction of each other bringing the peach in contact with the blades 9 to sever the peach to the stone. The portions 6 contacting the stone move apart permitting the partly severed peach to assume a position between the portions 7. The peach on entering the portions 7 becomes entirely severed into halves and the pit is gripped by the teeth on the jaws and securely held thereby, consequently by pulling the peach in a direction away from the pitter, the pit is maintained between the jaws and withdrawn from between the halves of the peach. In the instances of cling stone peaches, the pitter may be slightly oscillated relative to the halves of the peach to more effectively loosen the pit from the halves.

Referring to my modified form of invention the same principle is involved except the tool is made to work upon a bench or like support and consists of a base 12 having secured thereto and rising vertically therefrom supporting members 13. A lever 14 is pivoted to the upper ends of the supporting members 13 and pivotally connected to the lever are flexible members 16. The members 16 have portions thereof constructed to form blades 17, jaws 18 and substantially parallel portions 19 between which operates a headed pin 20 carried by a bracket 21 mounted on the supporting members 13. The blades 17 move downwardly towards the base to sever a peach. The natural tendency of the members 16 is to contract, the pin operating between the substantially parallel portions prevents the members 16 from moving into fully contracted position and maintain the blades 17 spread a desired distance so that as the blades pass through a peach the stone or pit passes into a space between the jaws 18. When the jaws 18 are lowered to the extent of engaging the stone or pit, the pin 20 has moved from between the portions 19, allowing the members 16 to contract and thereby bring the jaws 18 into engagement with the stone or pit so that when the peach is turned relative to the jaws they sever the pulp from the stone or pit. The base 12 is provided with an opening in which is positioned a drain 22. The peach is positioned over the drain 22 and said drain is of a size to freely receive the blades as the lever 14 is lowered to sever the peach in halves.

Having described the invention, I claim:

A combined cutter and pitter comprising a base, a supporting structure carried by said base, drain means carried by said base and acting as a rest for a peach, a lever pivoted to the supporting structure, a pair of members pivotally mounted on said lever and bent to provide opposed jaws extending toward said drain means, diverging blades connected to and spaced from said jaws and normally moving in the direction of said drain means by the action of said lever for severing a peach resting on said drain means by said blades and engaging the pit of said peach by the jaws, and a pin carried by said supporting structure and engaging said members to maintain them spread during a certain movement thereof and to permit said members to contract on further movement thereof.

VEREAU L. STATHEM.